(12) United States Patent
Johnson et al.

(10) Patent No.: US 12,397,622 B2
(45) Date of Patent: Aug. 26, 2025

(54) VEHICULAR REAR SLIDER WINDOW ASSEMBLY WITH ANTI-VIBRATION ELEMENTS ON MOVABLE WINDOW PANEL

(71) Applicant: Magna Exteriors, Inc., Troy, MI (US)

(72) Inventors: David K. Johnson, Holland, MI (US); Kyle S. Bowman, Holland, MI (US)

(73) Assignee: Magna Exteriors, Inc., Troy, MI (US)

(*) Notice: Subject to any disclaimer, the term of this patent is extended or adjusted under 35 U.S.C. 154(b) by 0 days.

(21) Appl. No.: 18/670,792

(22) Filed: May 22, 2024

(65) Prior Publication Data
US 2024/0391303 A1 Nov. 28, 2024

Related U.S. Application Data

(60) Provisional application No. 63/504,454, filed on May 26, 2023.

(51) Int. Cl.
*B60J 1/18* (2006.01)

(52) U.S. Cl.
CPC .................... *B60J 1/1853* (2013.01)

(58) Field of Classification Search
CPC ....................................................... B60J 1/1853
USPC ............... 49/413, 414, 415, 416; 16/DIG. 6
See application file for complete search history.

(56) References Cited

U.S. PATENT DOCUMENTS

| | | | | |
|---|---|---|---|---|
| 2,132,104 A | * | 10/1938 | Froeliger | B60J 10/74 49/440 |
| 2,209,041 A | * | 7/1940 | Sinchuk | E06B 3/44 292/77 |
| 2,781,876 A | * | 2/1957 | Van Fleet | E06B 3/44 292/76 |
| 4,004,629 A | * | 1/1977 | Kelly | E06B 3/4681 160/90 |
| 5,294,168 A | * | 3/1994 | Kronbetter | E06B 3/4681 296/146.16 |
| 5,473,840 A | * | 12/1995 | Gillen | B60J 10/74 49/408 |
| 5,505,023 A | * | 4/1996 | Gillen | B60J 1/1853 49/408 |
| 5,771,637 A | * | 6/1998 | Oikawa | E05F 11/382 49/416 |
| 5,799,444 A | | 9/1998 | Freimark et al. | |
| 5,836,110 A | * | 11/1998 | Buening | E05F 11/505 74/89.22 |

(Continued)

*Primary Examiner* — David E Sosnowski
(74) *Attorney, Agent, or Firm* — HONIGMAN LLP

(57) ABSTRACT

A vehicular rear slider window assembly includes a fixed window panel, a movable window panel and a frame portion. An upper edge region of the movable window panel is movably received in a channel of an upper rail of the frame portion. A first biasing element is compressed between a first inner surface of the upper rail and a first side of the movable window panel and urges the movable window panel away from the first inner surface. A second biasing element is compressed between a second inner surface of the upper rail and a second side of the movable window panel and urges the movable window panel away from the second inner surface. As the movable window panel is moved between the closed and opened positions, the first and second biasing elements guide movement of the movable window panel in a direction parallel to a centerline of the channel.

25 Claims, 25 Drawing Sheets

(56) References Cited

U.S. PATENT DOCUMENTS

| | | | |
|---|---|---|---|
| 5,943,823 A * | 8/1999 | Yoshida | B60J 5/0402 |
| | | | 49/416 |
| 6,305,125 B1 * | 10/2001 | Nozaki | B60J 1/17 |
| | | | 49/419 |
| 6,691,464 B2 | 2/2004 | Nestell et al. | |
| 7,003,916 B2 | 2/2006 | Nestell et al. | |
| 7,062,880 B2 * | 6/2006 | Renke | B60J 1/17 |
| | | | 49/416 |
| 7,073,293 B2 | 7/2006 | Galer | |
| 8,402,695 B2 | 3/2013 | Smith et al. | |
| 8,881,458 B2 * | 11/2014 | Snider | E05C 1/08 |
| | | | 49/213 |
| 8,915,018 B2 | 12/2014 | Snider | |
| 8,938,914 B2 | 1/2015 | Hulst et al. | |
| 9,266,409 B2 | 2/2016 | Tooker et al. | |
| 9,579,955 B2 | 2/2017 | Snider | |
| 9,731,580 B2 | 8/2017 | Snider et al. | |
| 10,023,026 B2 | 7/2018 | Snider et al. | |
| 10,501,977 B2 | 12/2019 | Snider et al. | |
| 10,841,983 B2 * | 11/2020 | Snider | B60J 1/002 |
| 11,247,546 B2 | 2/2022 | Tooker et al. | |
| 11,331,984 B2 | 5/2022 | Gustafson | |
| 11,912,110 B2 | 2/2024 | Snider et al. | |
| 11,952,820 B1 | 4/2024 | Snider et al. | |
| 12,043,092 B2 | 7/2024 | Tooker et al. | |
| 12,065,023 B2 | 8/2024 | Snider et al. | |
| 2003/0213179 A1 | 11/2003 | Galer | |
| 2004/0020131 A1 | 2/2004 | Galer et al. | |
| 2006/0107600 A1 | 5/2006 | Nestell et al. | |
| 2008/0127563 A1 | 6/2008 | Tooker | |
| 2008/0209814 A1 * | 9/2008 | Tarjeft | B60J 5/0402 |
| | | | 49/415 |
| 2012/0091114 A1 * | 4/2012 | Ackerman | B60J 1/1853 |
| | | | 49/70 |
| 2012/0117880 A1 * | 5/2012 | Lahnala | B60J 1/1853 |
| | | | 49/70 |
| 2014/0047772 A1 | 2/2014 | Hulst | |
| 2018/0010374 A1 * | 1/2018 | Gipson | B60J 1/1853 |
| 2019/0383084 A1 | 12/2019 | Snider et al. | |
| 2021/0355737 A1 | 11/2021 | Snider et al. | |
| 2024/0391303 A1 * | 11/2024 | Johnson | B60J 1/1853 |

* cited by examiner

VEHICULAR REAR SLIDER WINDOW ASSEMBLY WITH ANTI-VIBRATION ELEMENTS ON MOVABLE WINDOW PANEL

CROSS REFERENCE TO RELATED APPLICATION

The present application claims the filing benefits of U.S. provisional application Ser. No. 63/504,454, filed May 26, 2023, which is hereby incorporated herein by reference in its entirety.

FIELD OF THE INVENTION

The present invention relates to a slider window assembly for a vehicle and, more particularly, a rear slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks typically include three or more panels, such as two fixed window panels and a slidable window panel. The slidable window panel is supported by rails and may be moved along the rails to open and close the window.

SUMMARY OF THE INVENTION

A vehicular rear window slider assembly includes a fixed window panel, a movable window panel and a frame portion fixed relative to the fixed window panel. The frame portion includes an upper rail. The fixed window panel includes an opening, and the movable window panel is movable along the upper rail between (i) a closed position, where the movable window panel is disposed at the opening, and (ii) an opened position, where the movable window panel is disposed at least partially along the fixed window panel. An upper edge region of the movable window panel is movably received in a channel of the upper rail. A first biasing element is disposed between a first side of the movable window panel along the upper edge region and a first inner surface of the upper rail along the channel. A second biasing element is disposed between a second side of the movable window panel along the upper edge region and a second inner surface of the upper rail along the channel. The second side of the movable window panel is opposite the first side. The first inner surface and the second inner surface are along opposing sides of the channel. The first biasing element is at least partially compressed between the first inner surface of the upper rail and the first side of the movable window panel and urges the movable window panel away from the first inner surface of the upper rail. The second biasing element is at least partially compressed between the second inner surface of the upper rail and the second side of the movable window panel and urges the movable window panel away from the second inner surface of the upper rail.

These and other objects, advantages, purposes and features of the present invention will become apparent upon review of the following specification in conjunction with the drawings.

DESCRIPTION OF THE PREFERRED EMBODIMENTS

Figure 1:
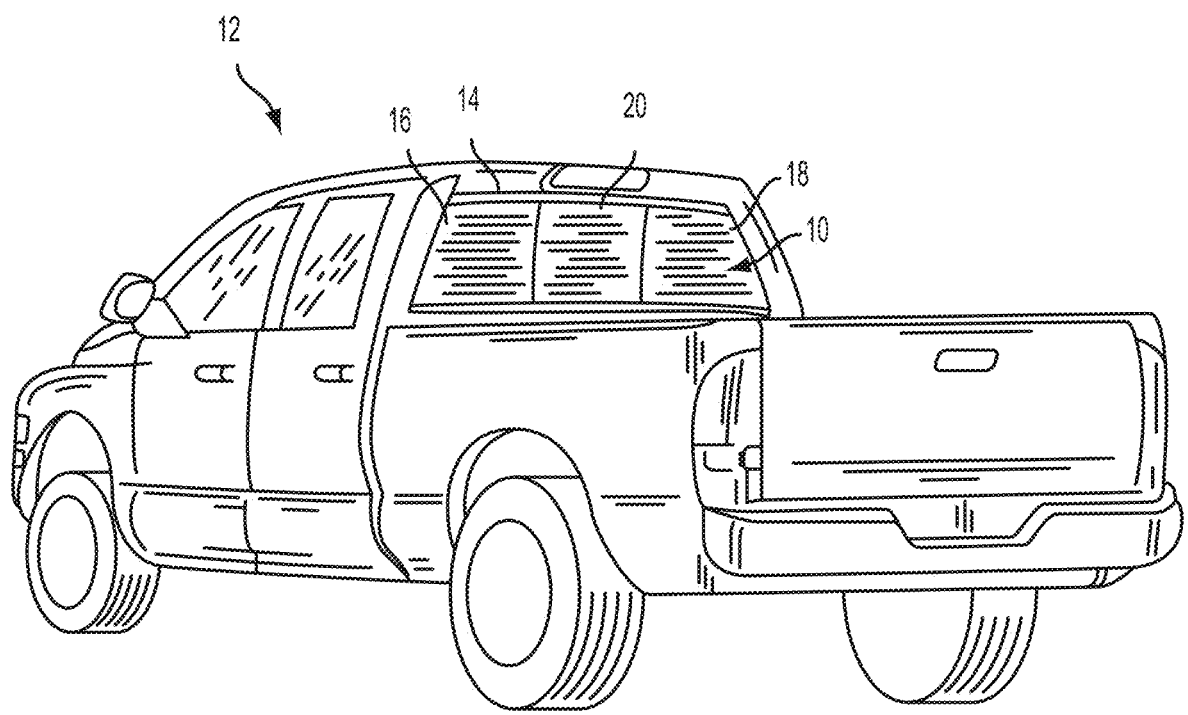
FIG. 1 is a rear perspective view of a pickup truck having a rear slider window assembly.

Referring now to the drawings and the illustrative embodiments depicted therein, a rear slider window assembly 10 of a vehicle 12 (such as a pickup truck or the like) includes a window frame 14, a fixed window panel or panels having an aperture that separates side window panels or portions 16, 18 and a movable window panel 20 that is movable relative to the window frame 14 and the fixed window panel between a closed position, where the movable window panel 20 is disposed at the aperture of the fixed window panel, and an opened position, where the movable window panel 20 is moved at least partially along the fixed window panel (FIG. 1).

The movable window panel 20 may be movable along the frame 14 (such as along an upper rail or channel and/or a lower rail or channel of the frame) relative to the fixed window panel via a drive system that moves the movable window panel in either direction to open and close the rear window, such as responsive to a user input or button or switch in the vehicle cabin. Optionally, the window panel 20 is manually movable along the frame 14 relative to the fixed window panel between the opened position and the closed position.

As discussed further below, a biasing or absorbing element or damping element or attenuating element is disposed along at least one of the upper edge region and the lower edge region of the movable window panel 20 and received along the corresponding upper rail or lower rail of the frame. The biasing element is at least partially compressed or flexed between the movable window panel and the rail, such as to absorb or dampen or attenuate vibrations from the movable window panel 20 as the vehicle travels along the road. Further, the biasing element may provide a biasing force between at least one side of the movable window panel 20 along the upper edge region and/or the lower edge region and the rail of the frame 14, such as to maintain alignment of the movable window panel 20 along the channels of the frame 14 as the movable window panel 20 moves between the closed position and the opened position and/or to maintain the movable window panel 20 in place after being moved to a position at or between the closed position and the opened position. That is, the rear slider window assembly includes a spring loaded track along which the movable window panel moves relative to the fixed window.

Referring to FIGS. 2-9, an upper rail 24 of the frame 14 defines an elongated, generally U-shaped channel portion that is disposed generally horizontally along the rear slider window and spanning at least part of each of the fixed window panels 16, 18. The upper rail 24 may extend along an upper edge region of the fixed window panels 16, 18 and/or an upper applique 17 that extends between the fixed window panels and above the aperture. An upper edge region or portion 22 of the movable window panel 20 is movably received along the upper rail 24 of the frame 14. For example, a guide element 26 is attached along the upper edge region 22 of the movable window panel 20 and is movably received along the U-shaped channel portion so as to be movable or slidable along the channel as the movable window panel 20 is moved between the closed position and the opened position relative to the upper rail 24 of the frame 14 and the one or more fixed window panels 16, 18.

The guide element 26 includes a receiving portion or trim portion 28 that receives and extends along the upper edge region 22 of the movable window panel 20. The trim portion 28 may include an elongated, generally U-shaped rail defining a generally U-shaped channel for receiving the upper edge region 22 of the movable window panel 20. The trim portion 28 of the guide element 26 may be attached to the movable window panel 20 in any suitable manner, such as via adhesive or press-fit at the upper edge region 22. For example, the trim portion 28 may comprise a flexible metallic element that is disposed along the upper edge region 22 of the movable window panel 20 and at least partially compressed or crimped to secure the guide element to the movable window panel 20.

Figure 2:
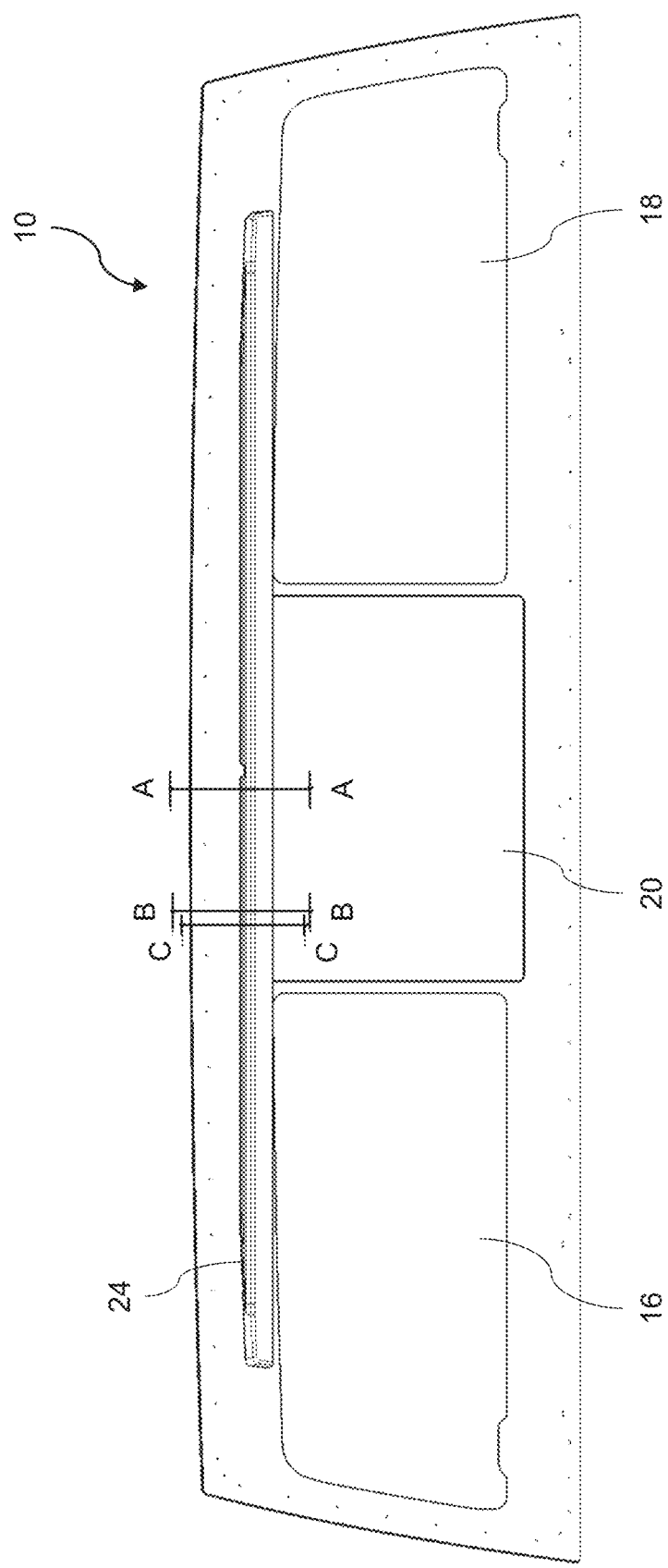
FIG. 2 is a plan view of a rear slider window assembly, where a guide element having biasing elements is attached along an upper edge region of a movable window panel and the guide element and upper edge region of the movable window panel are movably received along an upper rail of a frame of the rear slider window assembly.
Figure 2A:
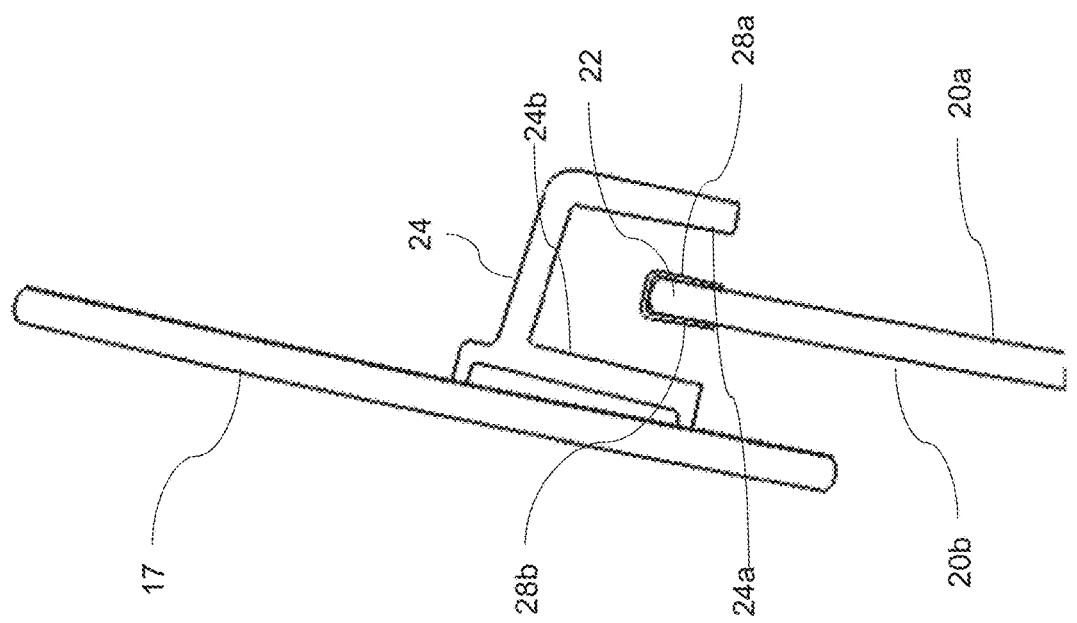
FIG. 2A is a sectional view taken along line A-A in FIG. 2.

With the generally U-shaped guide element 26 attached along the upper edge region 22 of the movable window panel 20, a first side 28a of the trim portion 28 extends at least partially at and along a first side 20a of the movable window panel 20 (e.g., an in-cabin facing side of the movable window panel) and a second side 28b of the trim portion 28 extends at least partially at and along a second side 20b of the movable window panel 20 opposite the first side 20a (e.g., an exterior facing side of the movable window panel). At least one biasing element or spring element or absorbing element or damping element or attenuating element 30 is disposed at and along the first side 28a of the trim portion 28 between the guide element and a first side or inner surface 24a of the upper rail 24 and at least one biasing element 30 is disposed at and along the second side 28b of the trim portion 28 between the guide element and a second side or inner surface 24b of the upper rail 24 (e.g., FIGS. 2A and 3A). In the illustrated example, two biasing elements 30 are disposed at and along each of the first side 28a and the second side 28b of the guide element 26 and it should be understood that the guide element 26 may include any suitable number of biasing elements 30 at and along the guide element 26.

The biasing elements 30 may comprise any suitable flexible and/or compressible material for absorbing or damping or attenuating vibrations between the upper rail 24 and movable window panel 20 and for applying the biasing force between the guide element 26 and the upper rail 24. For example, the biasing elements 30 may include curved or arcuate metallic bands or leaf springs having respective ends fixed along the outer surface of the trim portion 28 of the guide element 26 and curving outward from the guide element 26 so that, when at least partially compressed between the upper rail 24 and the trim portion 28, the metallic bands flatten and flex toward the trim portion 28. The biasing elements 30 may be integrally formed with the guide element 26, such that the curved metallic bands 30 extend from and are integrally formed with the metallic trim portion 28. Optionally, the biasing elements 30 may include strips of compressible or flexible material, such as a rubber or plastic material, that are adhesively attached at and along the respective sides of the trim portion 28. The strips of compressible material may include curved end portions, such as to allow slidable movement of the guide element 26 along the upper rail 24.

With the guide element 26 and upper edge region 22 of the movable window panel 20 received along the upper rail 24, the biasing elements 30 are at least partially compressed between the respective inner surfaces of the upper rail 24 and the movable window panel 20. Thus, the biasing elements 30 apply respective biasing forces along both sides of the movable window panel 20 and between the movable window panel 20 and the upper rail 24, such as to urge the movable window panel 20 toward a centerline of the upper rail 24 (that extends parallel to the longitudinal axis of the upper rail 24 and is approximately equidistant to the first inner surface 24a and the second inner surface 24b of the upper rail 24) as the movable window panel 20 moves or slides along the upper rail 24. In some examples, the upper rail 24 may curve according to a curvature of the fixed window panels and the channel of the upper rail 24 may similarly curve so that the movable window panel 20 moves along a curved path of travel between the closed position and the opened position. The biasing elements 30 urge the movable window panel 20 toward the center of the channel so that, as the window panel 20 is moved, the window panel 20 follows the curved path of travel and maintains a generally consistent or constant distance from the upper rail and/or fixed window panels.

Optionally, the biasing elements 30 apply a frictional force along the upper rail 24, such that, when the drive system and/or the user moves the window panel 20 between the closed position and the opened position, the frictional force is overcome to move the window panel 20 and, when the drive system and/or user stops moving the window panel 20, the frictional force between the biasing elements 30 and the upper rail 24 maintains the window panel 20 in position along the rail. In other words, the biasing elements 30 are compressed between the upper rail 24 and the movable window panel 20 to at least partially resist movement of the movable window panel 20 along the upper rail 24 when a moving force (e.g., from the drive system or a manual force from the user) is not being applied to move the window panel 20.

Figure 2B:
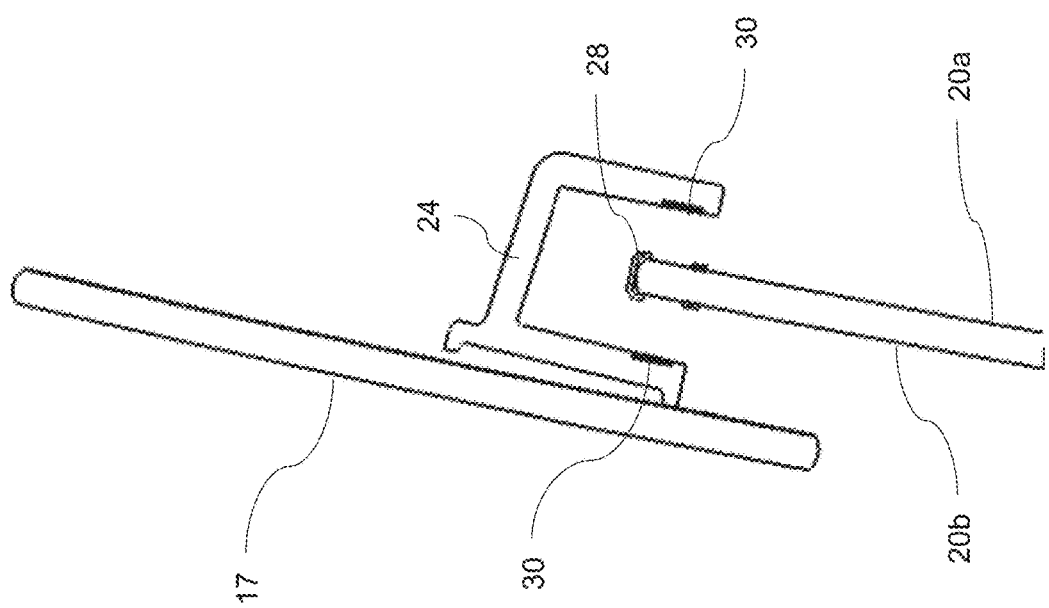
FIG. 2B is a sectional view taken along line B-B in FIG. 2.
Figure 2C:
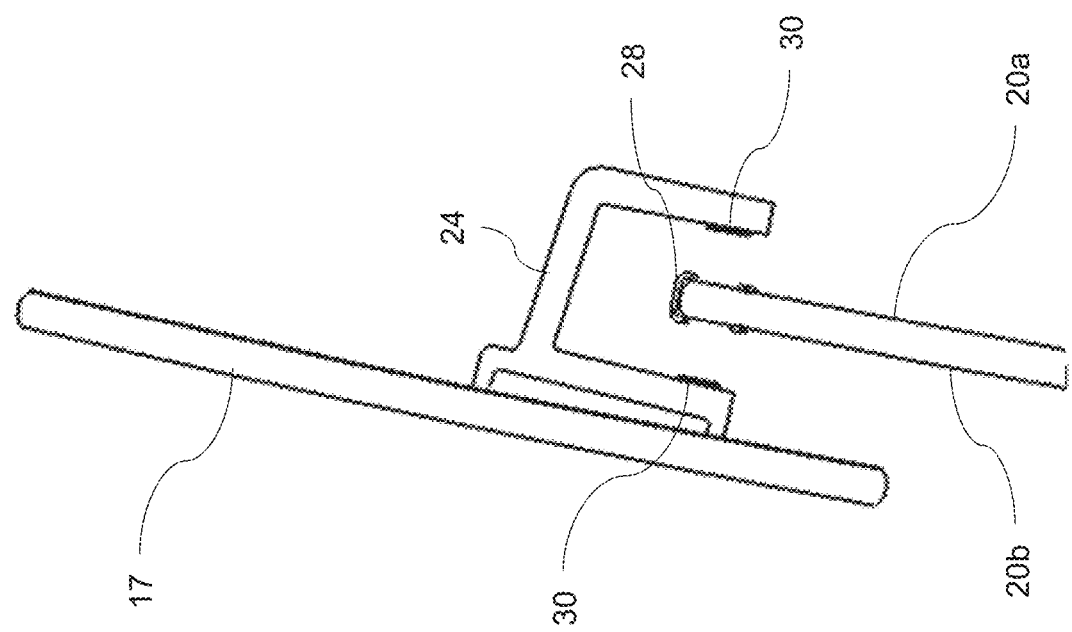
FIG. 2C is a sectional view taken along line C-C in FIG. 2.
Figure 3:
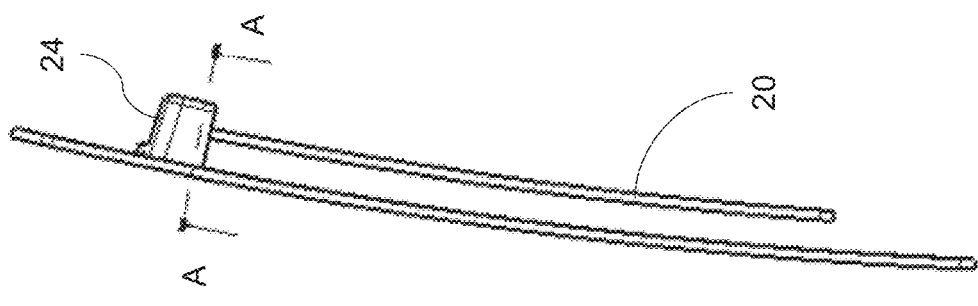
FIG. 3 is a side view of the rear slider window assembly of FIG. 2.
Figure 3A:
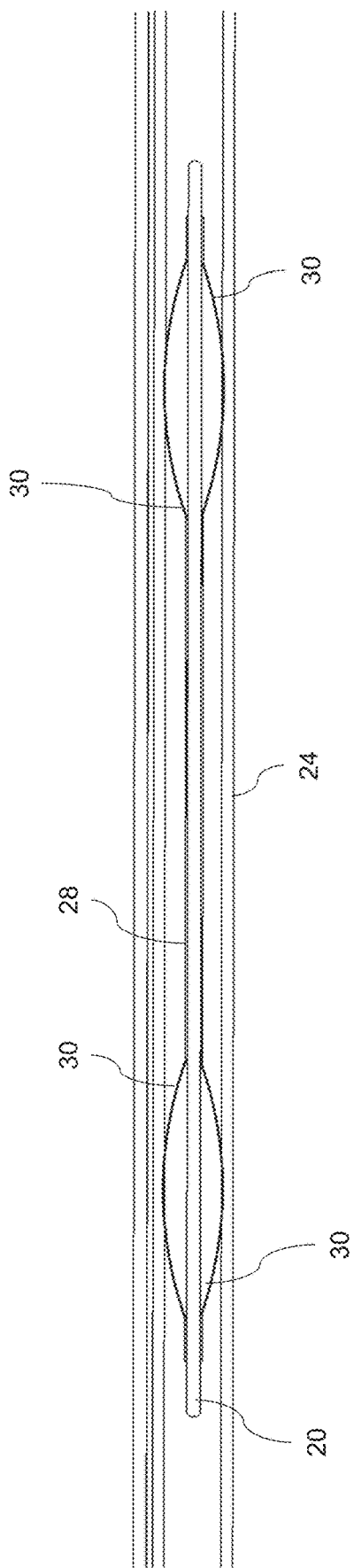
FIG. 3A is a sectional view taken along line A-A in FIG. 3.
Figure 4:
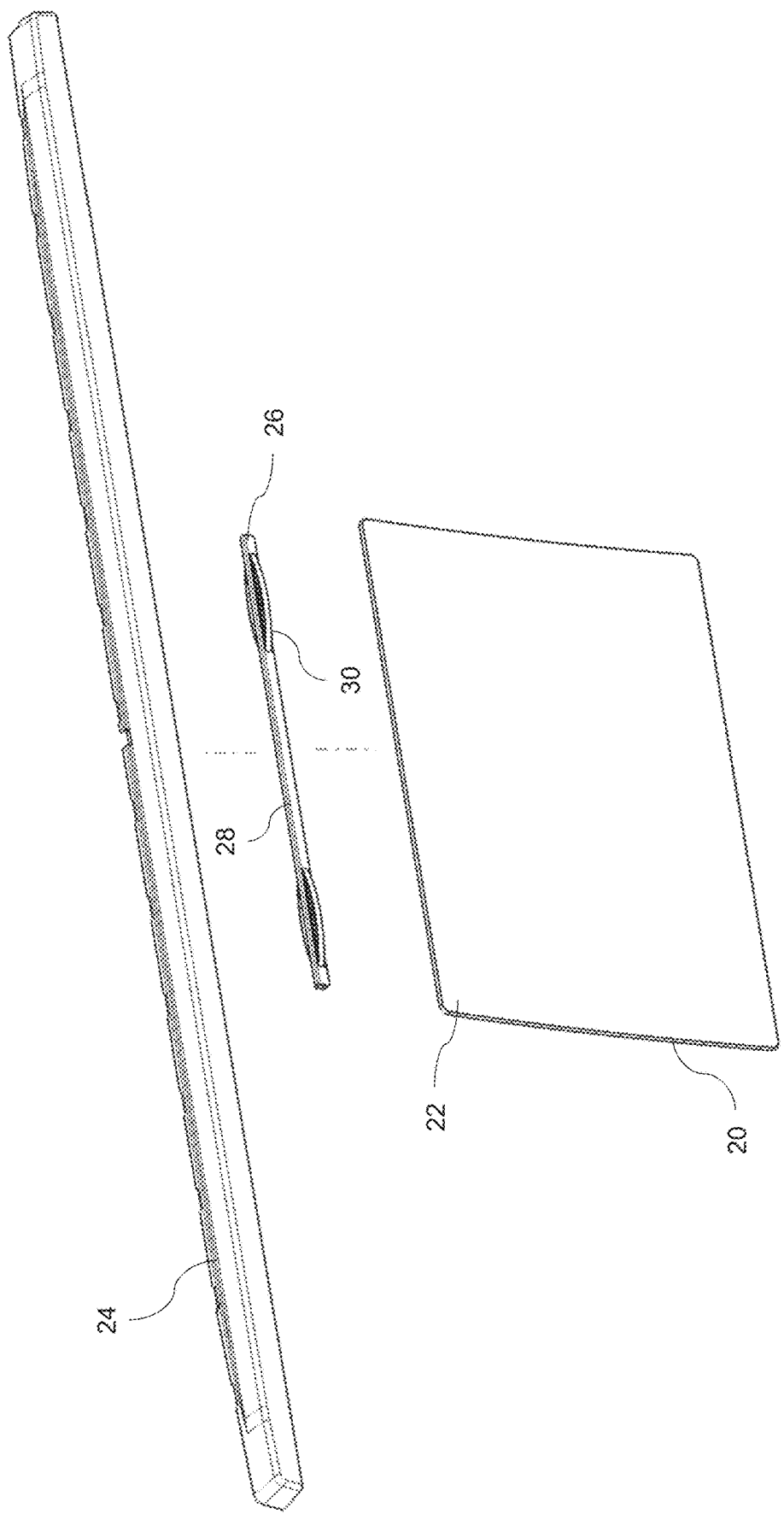
FIG. 4 is an exploded view of the movable window panel, guide element and upper rail of the rear slider window assembly of FIG. 2.
Figure 5:
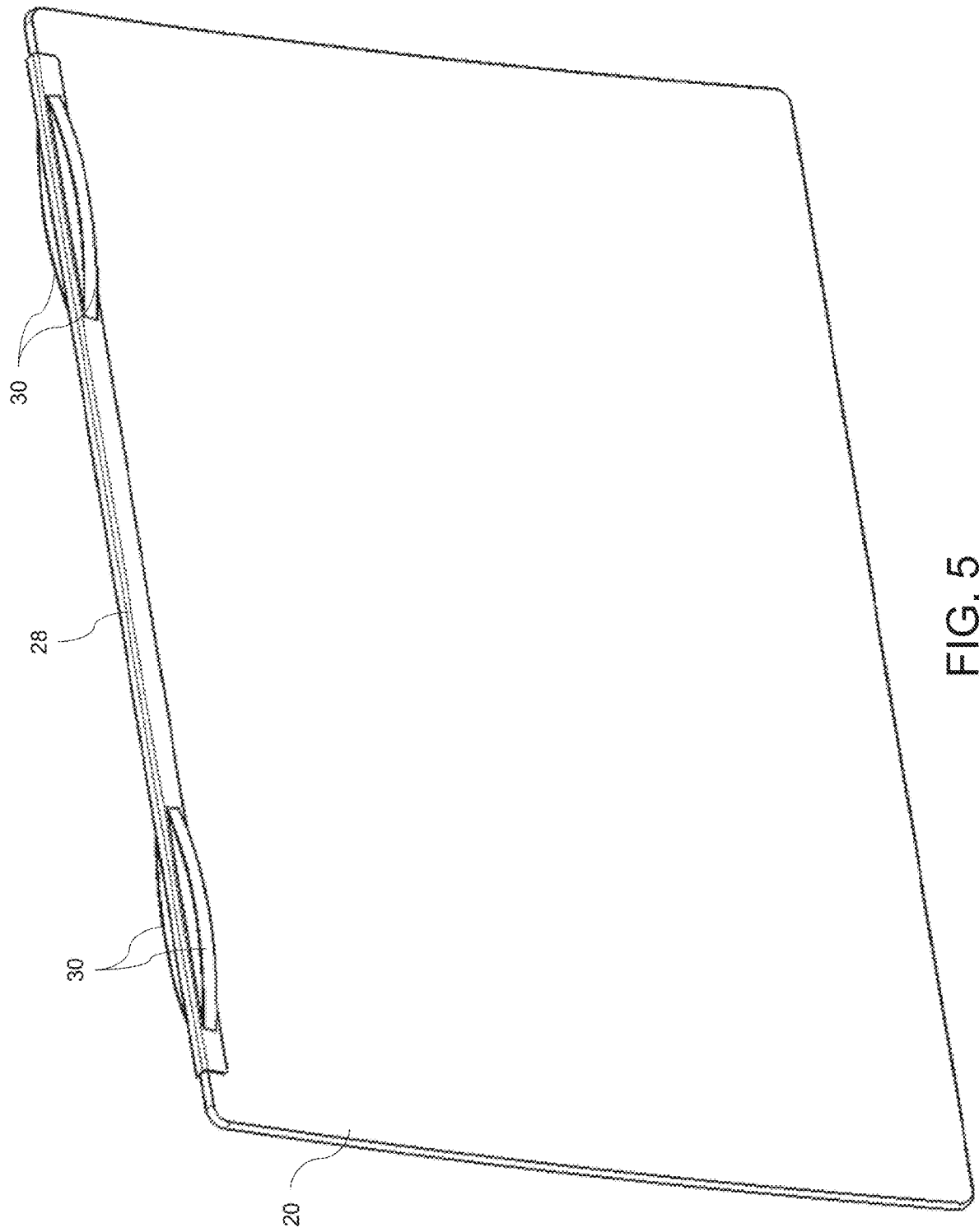
FIG. 5 is a perspective view of the movable window panel with the attached guide element having biasing elements of the rear slider window assembly of FIG. 2.
Figure 6:
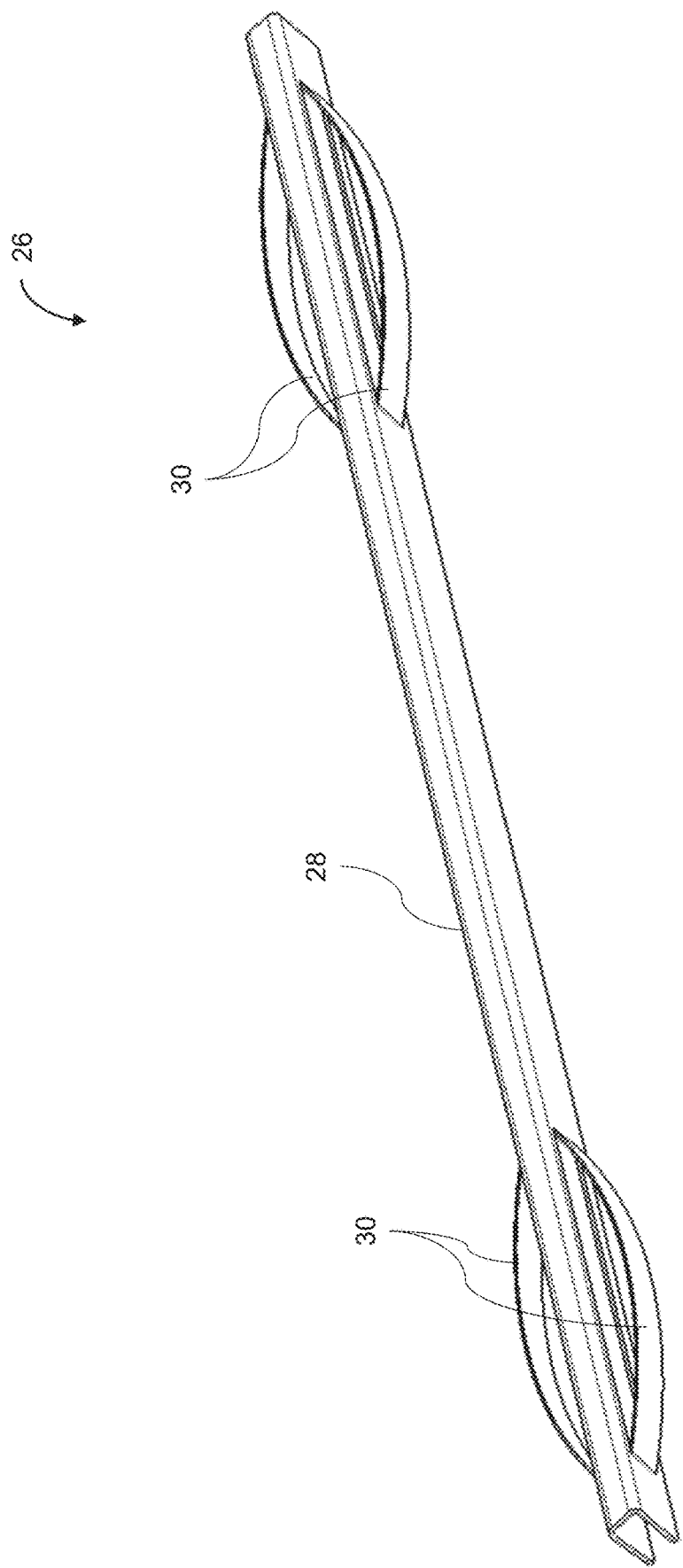
FIGS. 6-9 are views of the guide element having biasing elements of the rear slider window assembly of FIG. 2.
Figure 7:
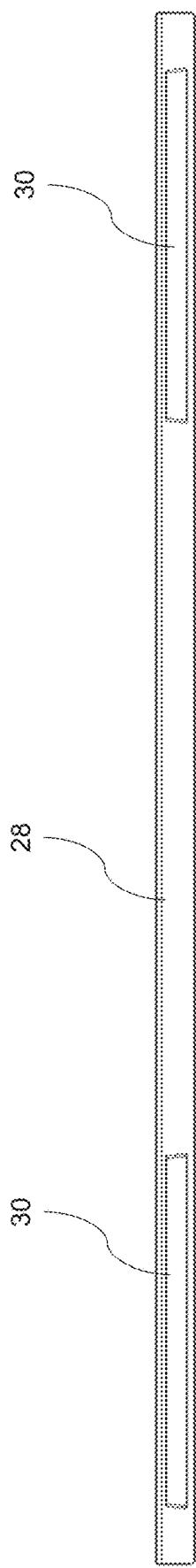
Figure 8:
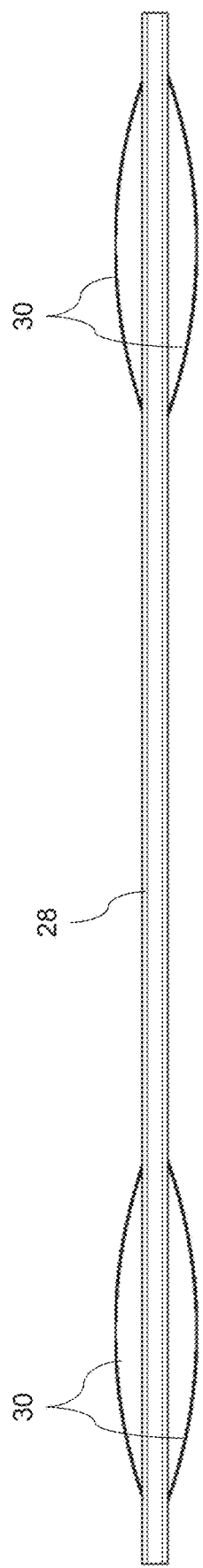
Figure 9:
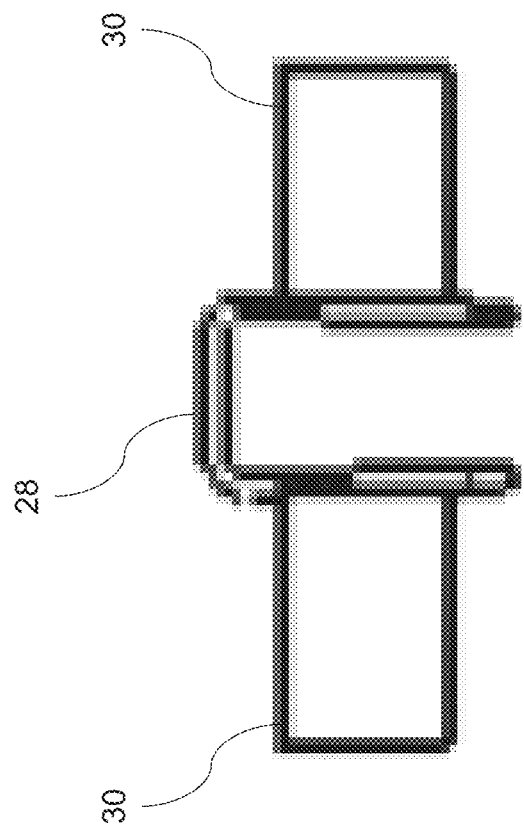

FIGS. 2A-2C and 3A depict sectional views of the upper edge region 22 of the movable window panel 20 and the guide element 26 received along the U-shaped channel of the upper rail 24. In the illustrated example of FIGS. 2A and 3A, the biasing elements 30 are disposed at and along respective end regions of the guide element 26 and thus, at a central portion of the guide element 26, the trim portion 28 engages the upper edge portion 22 of the movable window panel 20 so that the first side 28a extends at least partially along the first side 20a of the movable window panel 20 and the second side 28b extends at least partially along the second side 20b of the movable window panel 20 and no biasing element 30 extends between the trim portion 28 and the upper rail 24. As shown in FIGS. 2B and 3A, the biasing elements 30 are curved so that a central portion of the respective biasing elements 30 extends from the trim portion 28 and engages the inner surface of the upper rail 24. Respective end portions or outboard portions of the biasing elements 30 may not engage the inner surface of the upper rail 24 when the movable window panel 20 is centered along the rail 24 (e.g., FIGS. 2C and 3A). As the biasing elements 30 are compressed toward one side of the rail 24 (e.g., a force is applied at one side of the movable window panel), the curved biasing element 30 may flatten and an engagement area between the biasing element 30 and the inner surface of the rail 24 increases.

Optionally, the biasing element may be attached directly to the surface of the movable window panel. For example, and referring to FIGS. 10-17, a rear slider window assembly 110 includes a movable window panel 120 having an upper edge region or portion 122 that is movably received along the channel of an upper rail 124 so as to be movable or slidable along the upper rail 124 relative to fixed window panel portions 116, 118. One or more absorbing elements or damping elements or attenuating elements or biasing elements 130 (e.g., two or more biasing elements) are attached at the upper edge region 122 at and along a first side 120a of the movable window panel 120 (e.g., an in-cabin facing side of the movable window panel) and one or more biasing elements 130 (e.g., two or more biasing elements) are attached at the upper edge region 122 at and along a second side 120b of the movable window panel 120 opposite the first side 120a (e.g., an exterior facing side of the movable window panel). For example, the biasing elements 130 may be adhesively attached at the respective surfaces of the movable window panel 120 or the biasing elements 130 may be attached via threaded fasteners. Optionally, the movable window panel 120 and/or the biasing elements may be locally deformed (e.g., heated so as to at least partially melt or deform) to join the biasing elements 130 at the movable window panel 120.

Thus, with the upper edge region 122 and the biasing elements 130 received along the upper rail 124, the biasing elements 130 are disposed, respectively, between the first side 120a of the movable window panel 120 and a first side or inner surface 124a of the upper rail 124 and the second side 120b of the movable window panel 120 and a second side or inner surface 124b of the upper rail 124. The biasing elements 130 may be at least partially compressed between the respective inner surfaces of the upper rail 124 and the movable window panel 120, such as to align the window panel 120 with the centerline of the rail 124 or maintain a position of the window panel 120 along the rail 124.

In the illustrated example, the biasing elements 130 include arcuate spring elements that attach at opposing ends to the movable window panel 120 and that curve away from the movable window panel 120 between the opposing ends to allow for flexing of the biasing element 130 toward the movable window panel 120. For example, and as shown in FIGS. 14-17, each biasing element 130 includes a curved central portion 132 and flat or planar tabs 134 extending from opposite ends of the curved portion 132. The tabs 134 are attached at the outer surface of the movable window panel 120, such as adhesively attached, and the curved portion 132 extends at least partially away from the outer surface of the window panel 120 to engage the inner surface of the upper rail 124. The tabs 134 may include a plurality of projections that engage the window panel and establish a bond line thickness for the adhesive used to adhere or bond the tabs and biasing element to the window panel.

Figure 10:
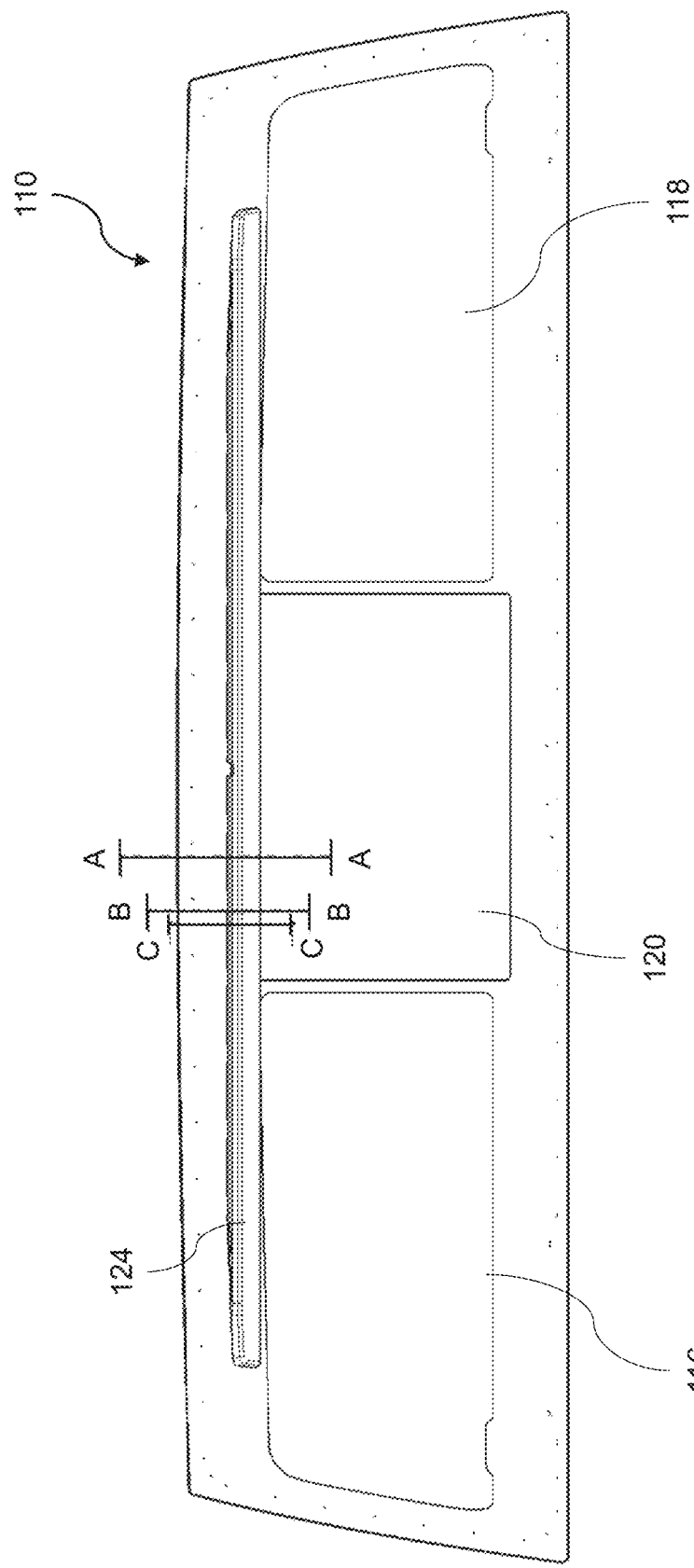
FIG. 10 is a plan view of another rear slider window assembly, where biasing elements are attached along an upper edge region of a movable window panel and the biasing elements and upper edge region of the movable window panel are movably received along an upper rail of a frame of the rear slider window assembly.
Figure 10A:
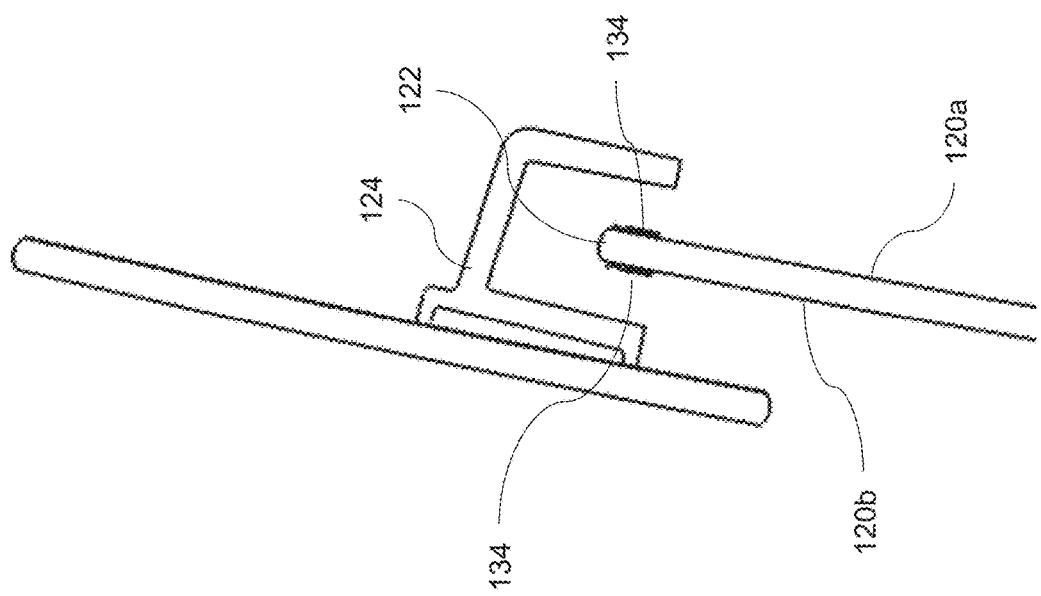
FIG. 10A is a sectional view taken along line A-A in FIG. 10.
Figure 10B:
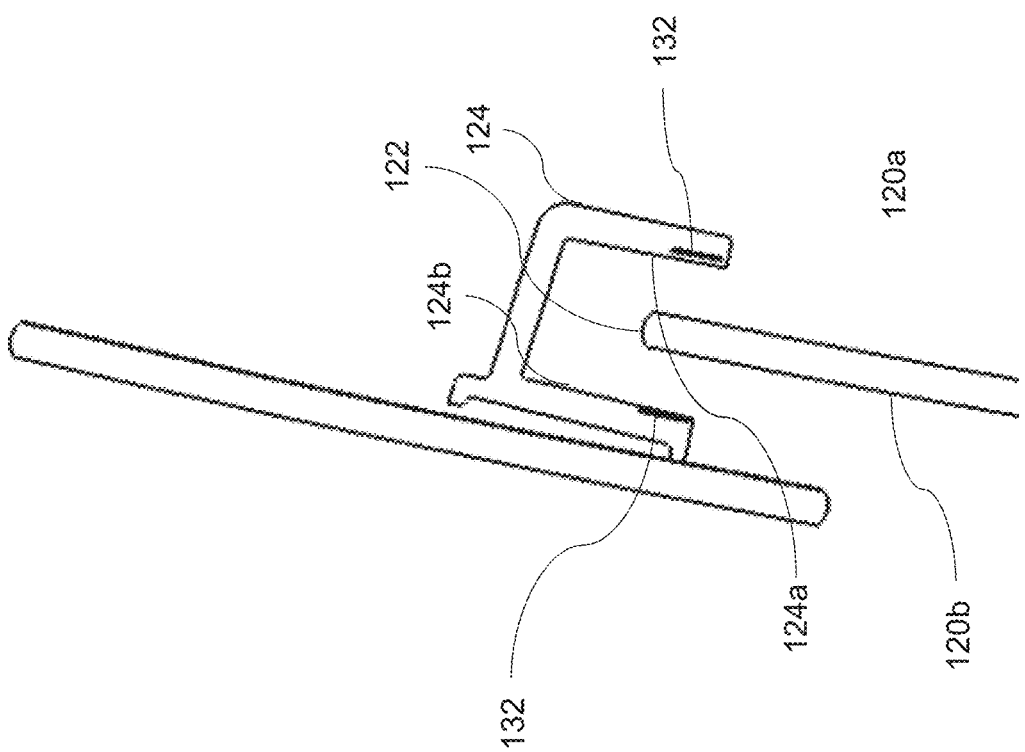
FIG. 10B is a sectional view taken along line B-B in FIG. 10.
Figure 10C:
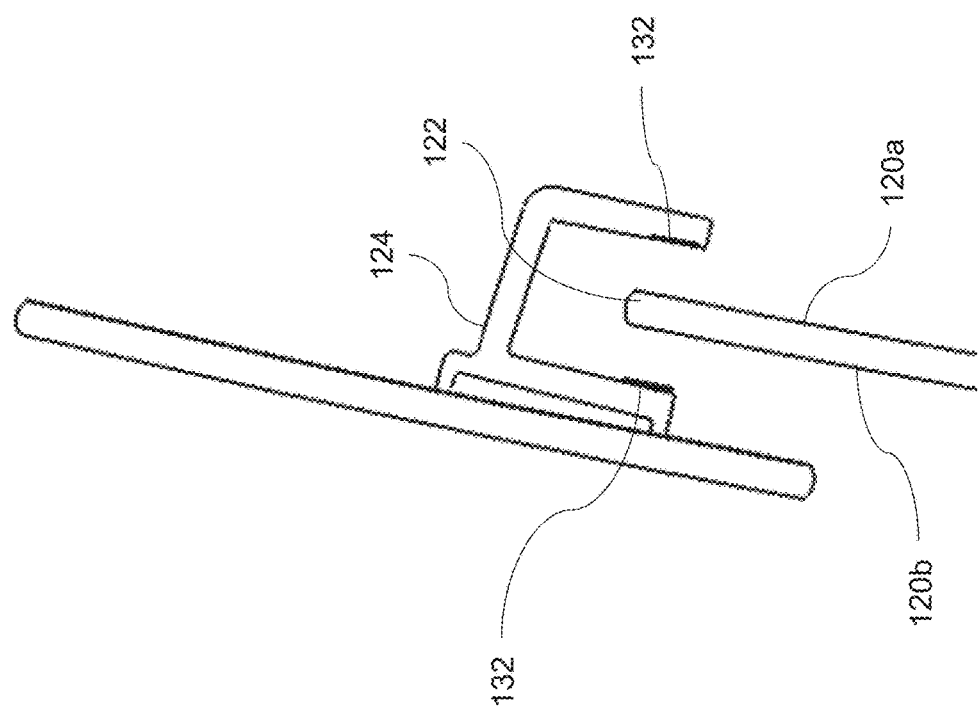
FIG. 10C is a sectional view taken along line C-C in FIG. 10.
Figure 11:
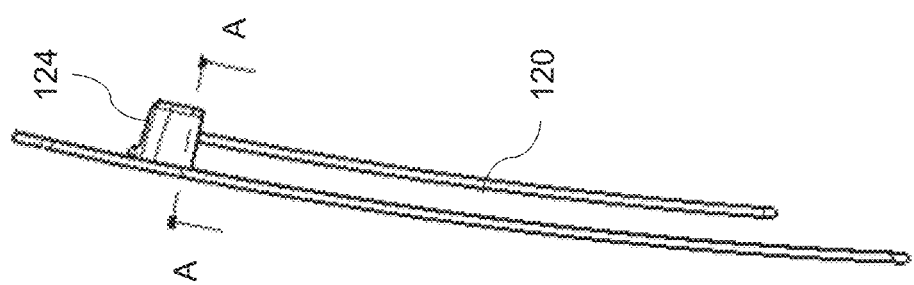
FIG. 11 is a side view of the rear slider window assembly of FIG. 10.
Figure 11A:
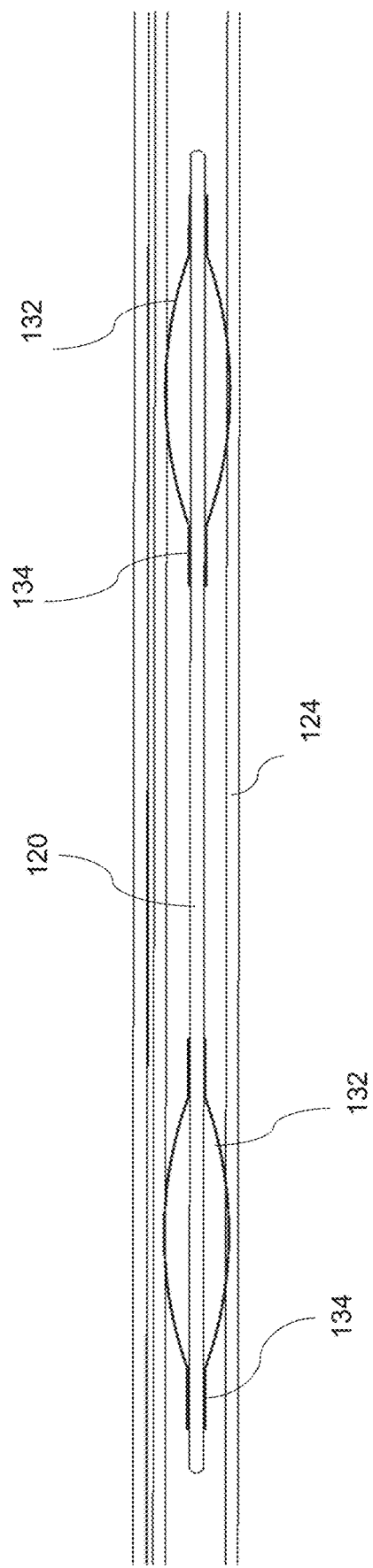
FIG. 11A is a sectional view taken along line A-A in FIG. 11.
Figure 12:
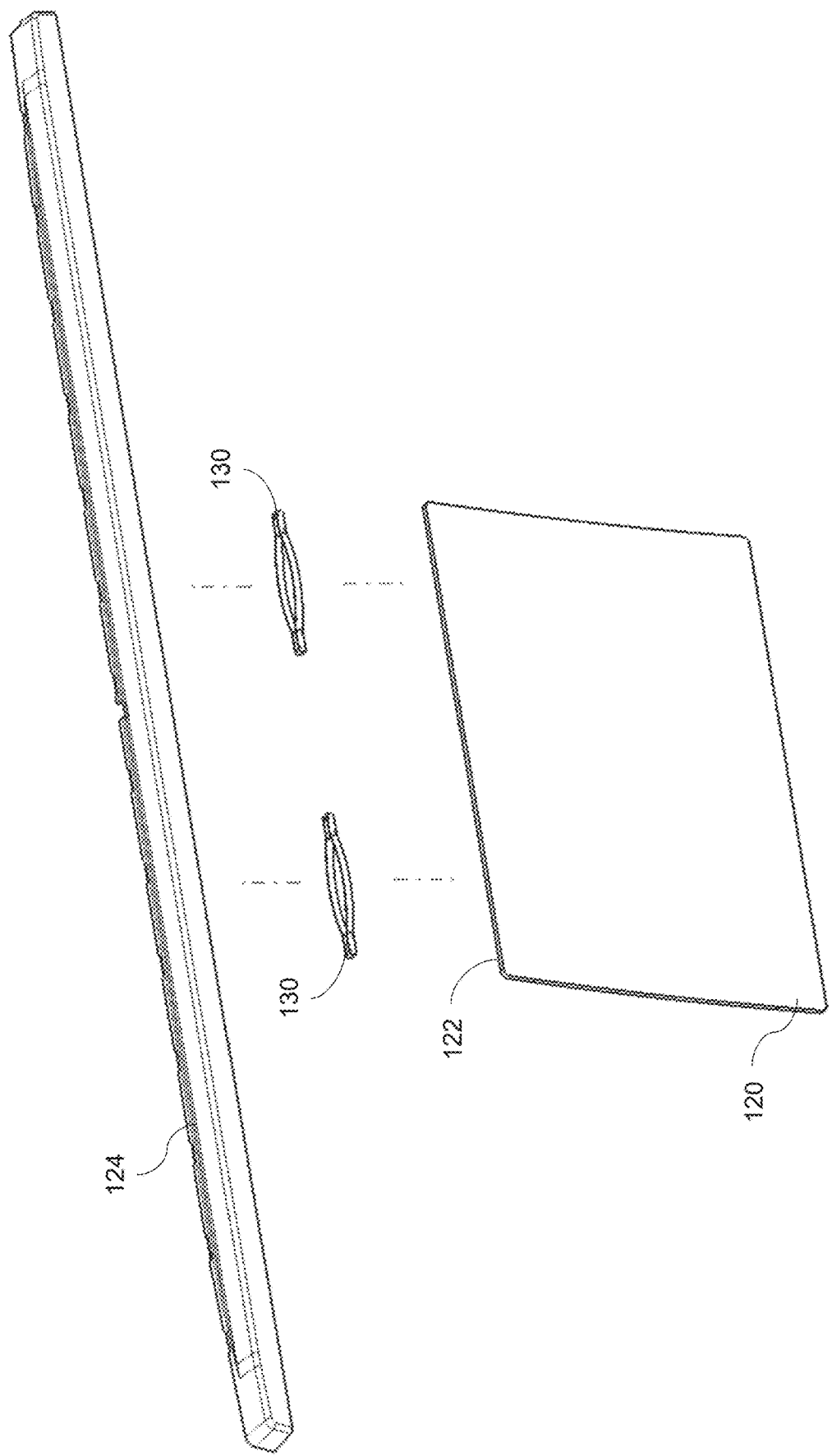
FIG. 12 is an exploded view of the movable window panel, biasing elements and upper rail of the rear slider window assembly of FIG. 10.
Figure 13:
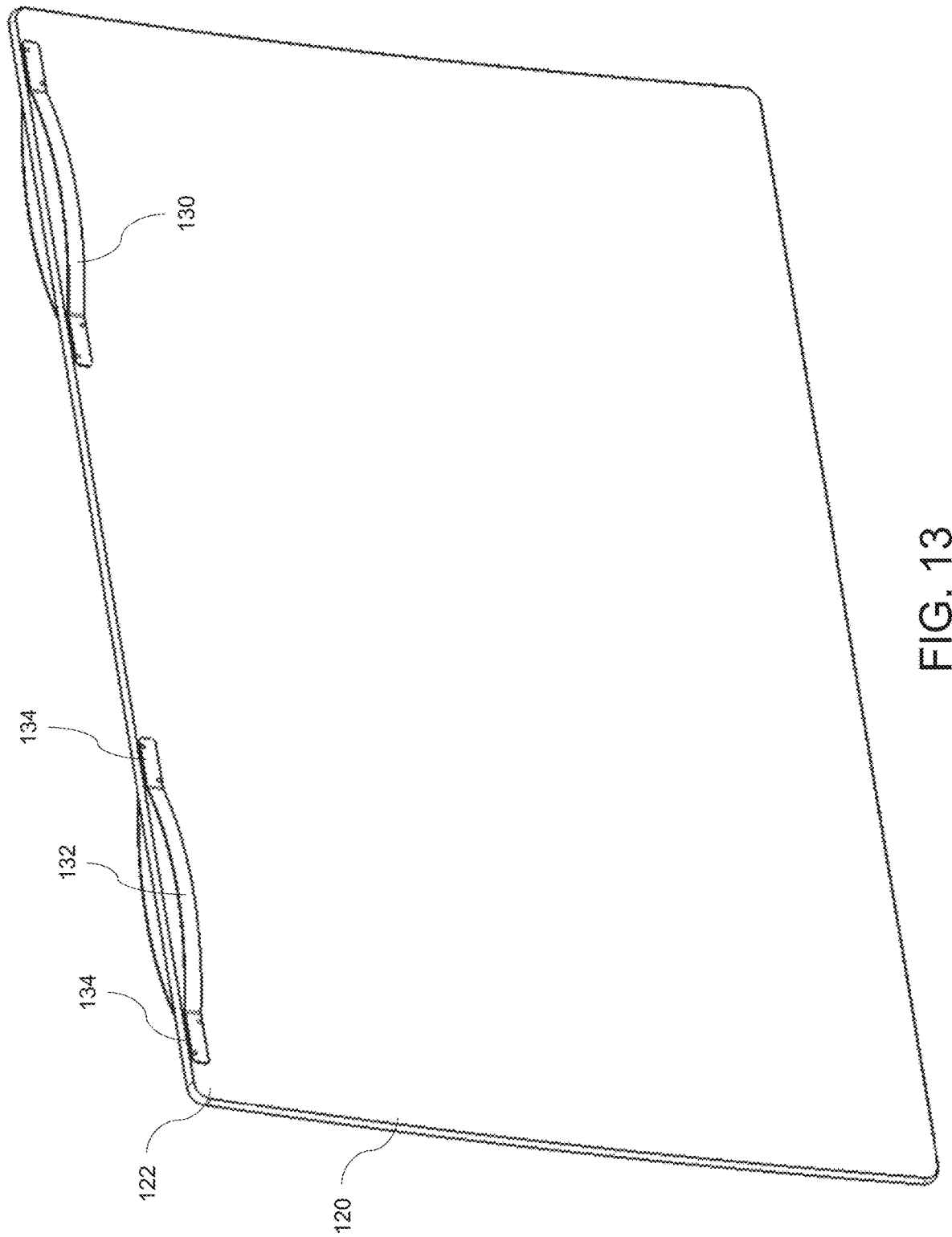
FIG. 13 is a perspective view of the movable window panel with the attached biasing elements of the rear slider window assembly of FIG. 10.
Figure 14:
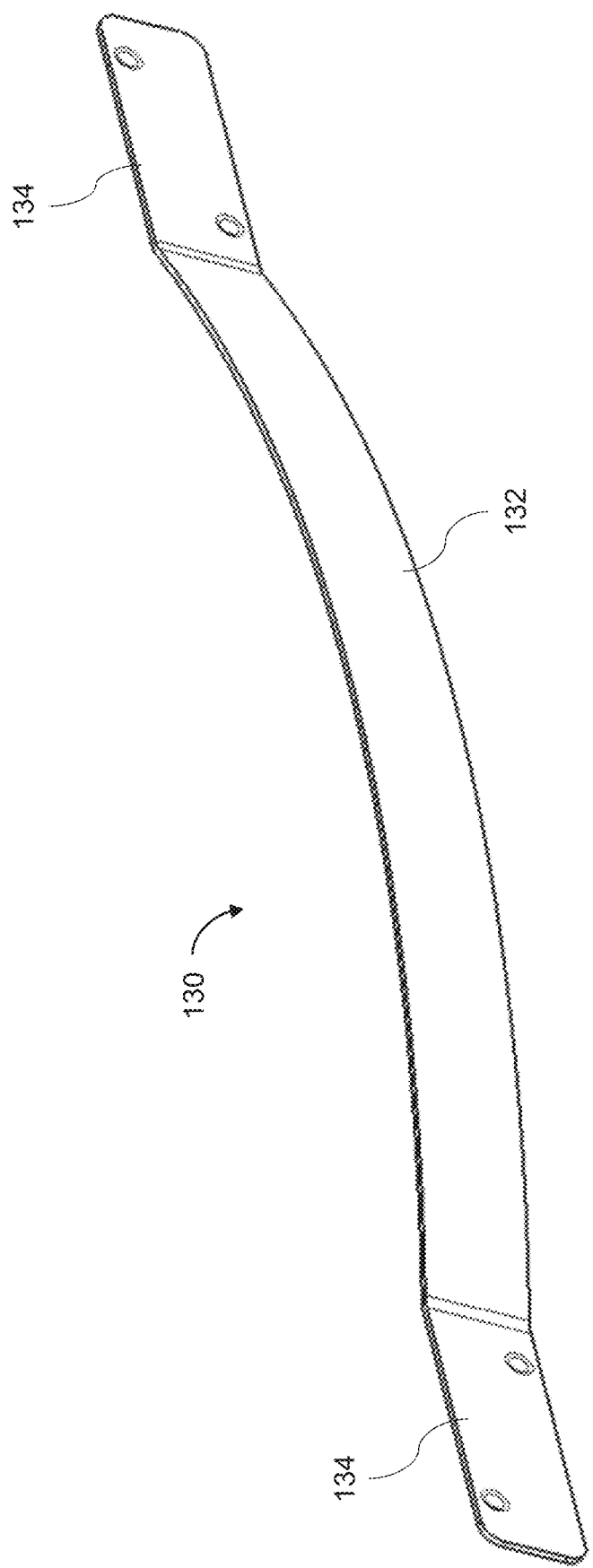
FIGS. 14-17 are views of one of the biasing elements of the rear slider window assembly of FIG. 10.
Figure 15:
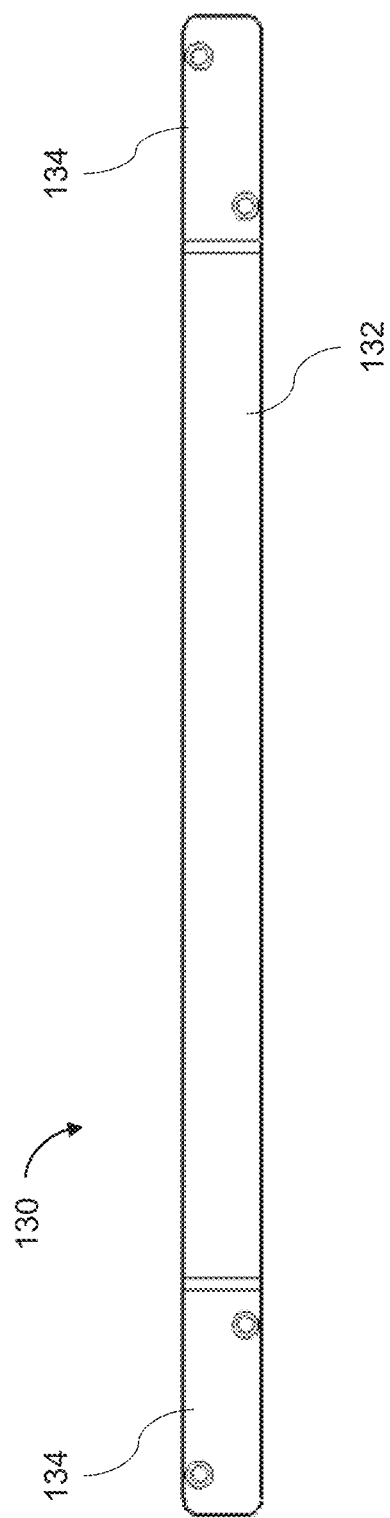
Figure 16:
Figure 17:
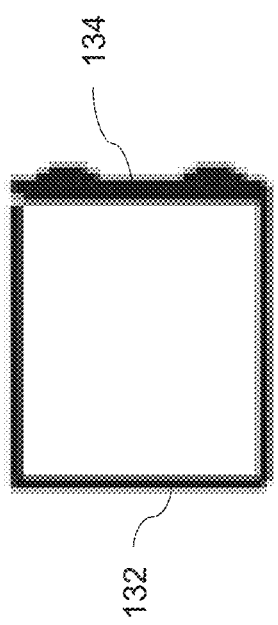

FIGS. 10A-10C and 11A depict sectional views of the upper edge region 122 of the movable window panel 120 and the biasing elements 130 disposed at and along the upper edge region 122. As shown in FIGS. 10A and 11A, the tabs 134 of the biasing elements 130 respectively are attached at and extend along the first side 120a and the second side 120b of the movable window panel 120. As shown in FIGS. 10B and 11A, the curved central portion 132 extends away from the movable window panel 120 and engages the inner surface of the upper rail 124. The curved portion 132 allows the biasing element 130 to flex or flatten when compressed between the window panel 120 and the rail 124, such that a portion of the curved portion 132 may be disposed between the window panel 120 and the upper rail 124 and not engaging the upper rail 124 (e.g., FIGS. 10C and 11A). As the biasing elements 130 are compressed toward one side of the rail 124 (e.g., a force is applied at one side of the movable window panel), the curved portion 132 of the biasing element 30 may flatten and an engagement area between the curved portion 132 and the inner surface of the rail 124 increases.

Thus, the rear slider window assembly at the rear portion of the cabin of the vehicle includes a fixed window panel and a movable window panel that is movable or slidable relative to the fixed window panel along a frame of the window assembly. The frame includes an upper channel or rail and an upper edge region of the movable window panel is movably received along the upper channel. A first absorbing element or damping element or attenuating element or biasing element is disposed between a first side of the movable window panel (e.g., an in-cabin facing side of the movable window panel) and an inner surface of the channel and a second absorbing element or damping element or attenuating element or biasing element is disposed between a second side of the movable window panel (e.g., an exterior facing side of the movable window panel) and an inner surface of the channel. For example, the biasing elements are disposed along a guide element or trim piece that is attached along the upper edge region of the movable window panel or the biasing elements are attached to the respective surfaces of the movable window panel (e.g., adhesively attached). The biasing elements absorb or dampen or attenuate vibrations during travel of the vehicle and bias or urge the movable window panel toward a center of the channel to maintain alignment of the movable window panel along the upper rail as the movable window panel moves between an opened position and a closed position.

The window panel may comprise a glass window panel, such as transparent tempered glass window panel or the like. Optionally, the window panel may comprise a non-glass material, such as a transparent or substantially transparent plastic or polymeric or acrylic material or the like. Although shown and described as a vehicular rear slider window assembly configured to be disposed at the rear portion of a cabin of a pickup truck, the window assembly may be suitable for other rear windows (such as a liftgate window such as for a hatchback vehicle or van or the like). Further, although described as having the biasing elements disposed between the movable window panel and the frame at the upper rail, the biasing elements may be disposed between the movable window panel and the frame at the lower rail (or optionally, the lower region of the movable window panel may be disposed at a carriage that is slidably received within the lower rail). Moreover, the biasing elements may be attached at the rail with the movable window panel moving along the rail relative to the fixed window panels and the biasing elements.

Optionally, the window assembly or assemblies and drive system may utilize aspects of the window assemblies and drive systems described in U.S. Pat. Nos. 11,331,984; 10,501,977; 8,938,914; 8,915,018; 8,881,458; 8,402,695; 7,073,293; 7,003,916; 6,691,464 and/or 5,799,444, and/or U.S. Publication Nos. US-2021/0355737; US-2014/0047772; US-2008/0127563; US-2006/0107600; US-2004/0020131 and/or US-2003/0213179, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A vehicular rear slider window assembly, the vehicular rear slider window assembly comprising:
    a fixed window panel, wherein the fixed window panel comprises an opening;
    a frame portion fixed relative to the fixed window panel, wherein the frame portion comprises an upper rail;
    a movable window panel, wherein the movable window panel comprises a first side and a second side, and wherein the second side of the movable window panel is opposite the first side;
    wherein an upper edge region of the movable window panel is movably received in a channel of the upper rail, and wherein the channel of the upper rail comprises a first inner surface and a second inner surface, and wherein the first inner surface and the second inner surface are along opposing sides of the channel;
    wherein the movable window panel is movable along the upper rail between (i) a closed position where the movable window panel is disposed at the opening and (ii) an opened position where the movable window panel is disposed at least partially along the fixed window panel;
    a first biasing element disposed between the first side of the movable window panel along the upper edge region and the first inner surface of the upper rail along the channel;
    wherein the first biasing element comprises (i) a pair of first attaching portions that are disposed at the first side of the upper edge region of the movable window panel and that are spaced from one another at the first side of the movable window panel and (ii) a first biasing portion that extends between the pair of first attaching portions and that is spaced from the first side of the movable window panel;
    a second biasing element disposed between the second side of the movable window panel along the upper edge region and the second inner surface of the upper rail along the channel;
    wherein the second biasing element comprises (i) a pair of second attaching portions that are disposed at the upper edge region of the second side of the movable window panel and that are spaced from one another at the second side of the movable window panel and (ii) a second biasing portion that extends between the pair of second attaching portions and that is spaced from the second side of the movable window panel;
    wherein the first biasing portion of the first biasing element is at least partially compressed between the first inner surface of the upper rail and the first side of the movable window panel and the first biasing element urges the movable window panel away from the first inner surface of the upper rail;
    wherein the second biasing portion of the second biasing element is at least partially compressed between the second inner surface of the upper rail and the second side of the movable window panel and the second biasing element urges the movable window panel away from the second inner surface of the upper rail; and
    wherein, as the movable window panel is moved between the closed position and the opened position, the first biasing element and the second biasing element guide movement of the movable window panel in a direction parallel to a centerline of the channel of the upper rail.

2. The vehicular rear slider window assembly of claim 1, wherein the pair of first attaching portions of the first biasing element are is adhesively attached at the first side of the movable window panel, and wherein the pair of second attaching portions of the second biasing element are is adhesively attached at the second side of the movable window panel.

3. The vehicular rear slider window assembly of claim 1, wherein a guide element is attached to the movable window panel at the upper edge region, and wherein the first biasing element is disposed at a first side of the guide element at the first side of the movable window panel and the second biasing element is disposed at a second side of the guide element at the second side of the movable window panel.

4. The vehicular rear slider window assembly of claim 3, wherein the guide element is adhesively attached to the movable window panel at the upper edge region.

5. The vehicular rear slider window assembly of claim 3, wherein the first biasing element and the second biasing element are integrally formed with the guide element.

6. The vehicular rear slider window assembly of claim 3, wherein the first biasing element and the second biasing element are adhesively attached to the guide element.

7. The vehicular rear slider window assembly of claim 1, wherein the first biasing element comprises a first arcuate spring element that extends from the first side of the movable window panel and engages the first inner surface of the upper rail, and wherein the second biasing element comprises a second arcuate spring element that extends from the second side of the movable window panel and engages the second inner surface of the upper rail.

8. The vehicular rear slider window assembly of claim 1, wherein the first biasing element and the second biasing element comprise one selected from the group consisting of (i) a flexible metallic material, (ii) a rubber material and (iii) a plastic material.

9. The vehicular rear slider window assembly of claim 1, wherein the channel comprises a generally U-shaped channel, and wherein the first inner surface of the upper rail faces the second inner surface of the upper rail.

10. The vehicular rear slider window assembly of claim 1, wherein the first biasing element and the second biasing element at least partially attenuate vibrations from passing between the upper rail and the movable window panel.

11. The vehicular rear slider window assembly of claim 1, wherein the first biasing element and the second biasing element cooperate to urge the movable window panel toward the centerline of the channel of the upper rail as the movable window panel is moved between the closed position and the opened position.

12. The vehicular rear slider window assembly of claim 11, wherein the centerline is equidistant to the first inner surface of the upper rail and the second inner surface of the upper rail.

13. The vehicular rear slider window assembly of claim 11, wherein the centerline is parallel to a longitudinal axis of the upper rail.

14. The vehicular rear slider window assembly of claim 1, wherein the vehicular rear slider window assembly is configured to be disposed at a rear portion of a cabin of a pickup truck.

15. A vehicular rear slider window assembly, the vehicular rear slider window assembly comprising:
    a fixed window panel, wherein the fixed window panel comprises an opening;
    a frame portion fixed relative to the fixed window panel, wherein the frame portion comprises an upper rail;
    a movable window panel, wherein the movable window panel comprises a first side and a second side, and wherein the second side of the movable window panel is opposite the first side;
    wherein an upper edge region of the movable window panel is movably received in a channel of the upper rail, and wherein the channel of the upper rail comprises a first inner surface and a second inner surface, and wherein the first inner surface and the second inner surface are along opposing sides of the channel;
    wherein the movable window panel is movable along the upper rail between (i) a closed position where the movable window panel is disposed at the opening and (ii) an opened position where the movable window panel is disposed at least partially along the fixed window panel;
    a first biasing element disposed at the upper edge region and between the first side of the movable window panel and the first inner surface of the upper rail along the channel;
    wherein the first biasing element is adhesively attached at the first side of the movable window panel, and wherein the first biasing element comprises (i) a pair of first attaching portions that are adhesively attached at the upper edge region of the first side of the movable window panel and that are spaced from one another at the first side of the movable window panel and (ii) a first arcuate spring element that extends between the pair of first attaching portions and that is spaced from the first side of the movable window panel, and wherein the first arcuate spring element engages the first inner surface of the upper rail;
    a second biasing element disposed at the upper edge region and between the second side of the movable window panel and the second inner surface of the upper rail along the channel;
    wherein the second biasing element is adhesively attached at the second side of the movable window panel, and wherein the second biasing element comprises (i) a pair of second attaching portions that are adhesively attached at the upper edge region of the second side of the movable window panel and that are spaced from one another at the second side of the movable window panel and (ii) a second arcuate spring element that extends between the pair of second attaching portions and that is spaced from the second side of the movable window panel, and wherein the second arcuate spring element engages the second inner surface of the upper rail;
    wherein the first arcuate spring element of the first biasing element is at least partially compressed between the first inner surface of the upper rail and the first side of the movable window panel and the first biasing element urges the movable window panel away from the first inner surface of the upper rail;
    wherein the second arcuate spring element of the second biasing element is at least partially compressed between the second inner surface of the upper rail and the second side of the movable window panel and the second biasing element urges the movable window panel away from the second inner surface of the upper rail; and
    wherein, as the movable window panel is moved between the closed position and the opened position, the first biasing element and the second biasing element guide movement of the movable window panel in a direction parallel to a centerline of the channel of the upper rail.

16. The vehicular rear slider window assembly of claim 15, wherein the first biasing element and the second biasing element comprise one selected from the group consisting of (i) a flexible metallic material, (ii) a rubber material and (iii) a plastic material.

17. The vehicular rear slider window assembly of claim 15, wherein the first biasing element and the second biasing element cooperate to urge the movable window panel toward the centerline of the channel of the upper rail as the movable window panel is moved between the closed position and the opened position.

18. The vehicular rear slider window assembly of claim 15, wherein the vehicular rear slider window assembly is configured to be disposed at a rear portion of a cabin of a pickup truck.

19. A vehicular rear slider window assembly, the vehicular rear slider window assembly comprising:
    a fixed window panel, wherein the fixed window panel comprises an opening;
    a frame portion fixed relative to the fixed window panel, wherein the frame portion comprises an upper rail;
    a movable window panel, wherein the movable window panel comprises a first side and a second side, and wherein the second side of the movable window panel is opposite the first side;
    wherein an upper edge region of the movable window panel is movably received in a channel of the upper rail, and wherein the channel of the upper rail comprises a first inner surface and a second inner surface, and wherein the first inner surface and the second inner surface are along opposing sides of the channel;

wherein the movable window panel is movable along the upper rail between (i) a closed position where the movable window panel is disposed at the opening and (ii) an opened position where the movable window panel is disposed at least partially along the fixed window panel;

a guide element attached to the movable window panel at the upper edge region, wherein the guide element comprises (i) a first side at the first side of the movable window panel and (ii) a second side at the second side of the movable window panel;

a first biasing element disposed at the first side of the guide element and between the first side of the movable window panel and the first inner surface of the upper rail along the channel;

wherein the first biasing element comprises (i) a pair of first attaching portions that are disposed at the first side of the guide element at the upper edge region of the movable window panel and that are spaced from one another at the first side of the guide element and (ii) a first arcuate spring element that extends between the pair of first attaching portions and that is spaced from the first side of the guide element, and wherein the first arcuate spring element engages the first inner surface of the upper rail;

a second biasing element disposed at the second side of the guide element and between the second side of the movable window panel and the second inner surface of the upper rail along the channel;

wherein the second biasing element comprises (i) a pair of second attaching portions that are disposed at the second side of the guide element at the upper edge region of the movable window panel and that are spaced from one another at the second side of the guide element and (ii) a second arcuate spring element that extends between the pair of second attaching portions and that is spaced from the second side of the guide element, and wherein the second arcuate spring element engages the second inner surface of the upper rail;

wherein the first arcuate spring element of the first biasing element is at least partially compressed between the first inner surface of the upper rail and the first side of the guide element and the first biasing element urges the movable window panel away from the first inner surface of the upper rail;

wherein the second arcuate spring element of the second biasing element is at least partially compressed between the second inner surface of the upper rail and the second side of the guide element and the second biasing element urges the movable window panel away from the second inner surface of the upper rail; and wherein, as the movable window panel is moved between the closed position and the opened position, the first biasing element and the second biasing element guide movement of the movable window panel in a direction parallel to a centerline of the channel of the upper rail.

20. The vehicular rear slider window assembly of claim 19, wherein the guide element is adhesively attached to the movable window panel at the upper edge region.

21. The vehicular rear slider window assembly of claim 19, wherein the first biasing element and the second biasing element are integrally formed with the guide element.

22. The vehicular rear slider window assembly of claim 19, wherein the pair of first attaching portions of the first biasing element are adhesively attached at the first side of the guide element, and wherein the pair of second attaching portions of the second biasing element are adhesively attached at the second side of the guide element.

23. The vehicular rear slider window assembly of claim 19, wherein the first biasing element and the second biasing element comprise one selected from the group consisting of (i) a flexible metallic material, (ii) a rubber material and (iii) a plastic material.

24. The vehicular rear slider window assembly of claim 19, wherein the first biasing element and the second biasing element cooperate to urge the movable window panel toward the centerline of the channel of the upper rail as the movable window panel is moved between the closed position and the opened position.

25. The vehicular rear slider window assembly of claim 19, wherein the vehicular rear slider window assembly is configured to be disposed at a rear portion of a cabin of a pickup truck.

* * * * *

UNITED STATES PATENT AND TRADEMARK OFFICE
CERTIFICATE OF CORRECTION

PATENT NO. : 12,397,622 B2
APPLICATION NO. : 18/670792
DATED : August 26, 2025
INVENTOR(S) : David K. Johnson et al.

It is certified that error appears in the above-identified patent and that said Letters Patent is hereby corrected as shown below:

In the Claims

<u>Column 8</u>
Claim 2, Line 37, "element are is adhesively" should be --element are adhesively--
Claim 2, Lines 39-40, "element are is adhesively" should be --element are adhesively--

Signed and Sealed this
Twenty-third Day of September, 2025

John A. Squires
*Director of the United States Patent and Trademark Office*